United States Patent [19]
Toshimitsu et al.

[11] Patent Number: 5,366,298
[45] Date of Patent: Nov. 22, 1994

[54] HYDRODYNAMIC BEARING

[75] Inventors: Manabu Toshimitsu, Fujisawa; Hiroko Fuse, Tokyo, both of Japan

[73] Assignee: Ebara Corporation, Tokyo, Japan

[21] Appl. No.: 160,189

[22] Filed: Dec. 2, 1993

[30] Foreign Application Priority Data

Dec. 3, 1992 [JP] Japan .................. 4-350411

[51] Int. Cl.$^5$ ............................ F16C 32/06
[52] U.S. Cl. .................. 384/107; 384/100; 384/907.1
[58] Field of Search .......... 384/100, 107, 112, 114, 384/121, 123, 907.1; 423/446

[56] References Cited

U.S. PATENT DOCUMENTS

| | | | |
|---|---|---|---|
| 4,436,797 | 3/1984 | Brady et al. | 430/5 |
| 4,490,229 | 12/1984 | Mirtich et al. | 423/446 X |
| 4,717,268 | 1/1988 | Orkin | 384/280 |
| 4,998,033 | 5/1991 | Hisabe et al. | 384/112 X |
| 5,067,826 | 11/1991 | Lemelson | 384/907.1 |
| 5,127,744 | 7/1992 | White et al. | 384/107 X |
| 5,142,173 | 8/1992 | Konno et al. | 384/107 X |

FOREIGN PATENT DOCUMENTS

| | | |
|---|---|---|
| 0479197 | 4/1992 | European Pat. Off. . |
| 0488402 | 6/1992 | European Pat. Off. . |
| 0515687 | 12/1992 | European Pat. Off. . |
| 2404325 | 7/1975 | Germany . |
| 63-88313 | 4/1988 | Japan . |
| 63-88314 | 4/1988 | Japan . |

OTHER PUBLICATIONS

Patent Abstracts of Japan, vol. 13, No. 265 (M–839) (3613) Jun. 19, 1989.

*Primary Examiner*—Thomas R. Hannon
*Attorney, Agent, or Firm*—Wenderoth, Lind & Ponack

[57] ABSTRACT

A hydrodynamic bearing includes first and second thrust plates held against respective axially opposite ends of a cylindrical radial bearing member, and a cylindrical radial sleeve provided concentrically with the cylindrical radial bearing. The outer circumferential surface of the cylindrical radial bearing member and the inner circumferential surface of the cylindrical radial sleeve serve as sliding surfaces jointly making up a radial hydrodynamic bearing assembly, and the confronting surfaces of the first and second thrust plates and the end surfaces of the cylindrical radial sleeve serve as sliding surfaces jointly making up a thrust hydrodynamic bearing assembly. At least one of the sliding surfaces of the thrust hydrodynamic bearing assembly has grooves formed therein for generating a hydrodynamic pressure. At least one of the sliding surfaces of the radial hydrodynamic bearing assembly is coated with a uniform hydrogenated amorphous carbon film. At least one of the sliding surfaces of the thrust hydrodynamic bearing assembly is coated with a uniform hydrogenated amorphous carbon film.

15 Claims, 6 Drawing Sheets

HYDRODYNAMIC BEARING

BACKGROUND OF THE INVENTION

1. Field of the Invention

The present invention relates to a hydrodynamic bearing, more particularly to a hydrodynamic bearing for use in spindle motors, drum motors, or the like in data storage devices.

2. Description of the Related Art

Spindle motors and drum motors in data storage devices, including hard disk drives (HDD) and magnetic tape storage devices for example, are required to have highly accurate rotational performance and low power requirements. To meet such performance and power requirements, efforts have been made to employ hydrodynamic bearings in such spindle motors and drum motors. However, the hydrodynamic bearings suffer certain inherent drawbacks. Specifically, the hydrodynamic bearings have sliding surfaces that are held in contact with each other when they start and stop rotating. Depending on the material which the sliding surfaces are made of, how they are machined, and the accuracy with which they are assembled, the sliding surfaces may wear very rapidly owing to frictional contact therebetween, thus posing a durability problem.

One solution to the above problem is to make at least the sliding surfaces out of a ceramic material which is highly durable and machinable with high dimensional accuracy. In some cases, all the parts of a hydrodynamic bearing are made of a ceramic material, and then sliding surfaces are ground to a flat finish. Alternatively, all the parts of a hydrodynamic bearing are made of a metallic material such as stainless steel, aluminum, or the like, then sliding surfaces are ground to a flat finish and are coated with a ceramic material such as silicon carbide (SiC), silicon nitride ($Si_3N_4$), alumina ($Al_2O_3$), or the like.

However, even ceramic-coated hydrodynamic bearings fail to satisfy a desired level of durability when they are frequently started and stopped, and are hence not practical for use in data storage devices. Ceramic materials have such a property that when sliding surfaces are pressed against each other under a pressure in excess of a certain pressure level, the coefficient of friction abruptly increases, resulting in accelerating the wear on the sliding surfaces. This property of the ceramic materials is responsible for the above durability problem of the hydrodynamic bearings with ceramic sliding surfaces or ceramic coating films.

Attempts have been made to improve the wear resistance of the sliding surfaces under high pressures. One of the most simple ways is to coat a thin film of liquid lubricant such as oil or grease on the sliding surfaces.

When such a liquid lubricant is applied to the sliding surfaces, a lubricant film having a thickness ranging from 0.01 to several microns is formed on each of the sliding surfaces. However, the adhesion between the lubricant film and the sliding surfaces is so weak that the liquid lubricant tends to separate and scatter around when the bearing is rotated. Consequently, when such a hydrodynamic bearing is employed in a hard disk drive, the scattered liquid lubricant is apt to adversely affect the magnetic medium. Where the hydrodynamic bearing is incorporated in a drum motor, the scattered liquid lubricant is liable to become attached to the drum or heads, adversely affecting their performance. Thinning out the lubricant film in an effort to minimize the scattering of the liquid lubricant results in displacement of the liquid lubricant or shearing of the lubricant film when the bearing is repeatedly started and stopped. When this happens, the sliding surfaces of the bearing are brought into direct contact with each other, and their direct contact causes quick wear on the sliding surfaces.

To solve the above problems, there have heretofore been two proposals for improving the performance of hydrodynamic bearings as described below.

According to the first proposal, the sliding surfaces of a hydrodynamic bearing are coated with a self-lubricating solid lubricant such as molybdenum disulfide or graphite by sputtering or the like. The coated solid lubricant film is bonded to the sliding surfaces more strongly than the liquid lubricant, and hence will not be scattered around while the bearing is rotating. Under relatively low pressures, the coated solid lubricant film has a low coefficient of friction, and is more durable than the liquid lubricant film.

The second proposal, Japanese laid-open patent publication No. 64-65322 discloses a hydrodynamic bearing having rotatable confronting surfaces which slide against relative to each other. At least one of the sliding surfaces is coated with a lubricating film made of one or both of organopoly-siloxane and a fluoropolymer having a functional group. The lubricating film with a functional group is strongly bonded to the bearing surface, and hence is prevented from being moved or scattered during rotation of the bearing. Therefore, the sliding surfaces are highly resistant to wear.

In the first proposal, when the pressure applied to the sliding surfaces exceeds a certain pressure level, the nonpolar solid lubricant film on both sliding surfaces is removed by sliding contact with each other. Once the continuity of the lubricant film is broken, it cannot be recovered by itself. When the lubricant film is broken, the coefficient of friction of the sliding surfaces are abruptly increased, resulting in an increase in the frictional torque which is applied when the bearing starts rotating. After repeated starting and stopping of rotation of the bearing, the motor which incorporates the bearing may possibly be unable to start to rotate when energized.

For the bearing of the second proposal, a sliding test was conducted on a bearing whose sliding surfaces were coated with a lubricating film according to the disclosure. As long as the sliding surfaces were pressed against each other under a relatively low pressure, their coefficient of friction was low and remained unchanged for a long period of operation and provided better results than the nonpolar solid lubricant film of the first proposal. When the sliding surfaces were pressed against each other under a pressure in excess of about 50 $gf/cm^2$, the lubricating film was broken and the coefficient of friction was abruptly increased.

With the thickness of the lubricating film exceeding about 60 Å, the lubricating film had a meniscus effect or underwent "stiction" caused probably by chemically activated adsorption, thus increasing the static frictional torque to the point where the motor was unable to start. When the lubricating film was too thin, it was broken while the bearing was repeatedly started and stopped under a relatively low contact pressure applied. Thus, the sliding surfaces themselves came into contact and were rapidly worn down.

The lubricating film according to the second proposal showed best results when its thickness ranged from about 30 to 50 Å. However, it is highly difficult to keep the lubricating film thickness constant, making it impossible to mass-produce the bearing efficiently.

The hydrodynamic bearing generally includes a thrust hydrodynamic bearing assembly having flat sliding surfaces and a radial hydrodynamic bearing assembly having cylindrical sliding surfaces. These sliding surfaces are in contact with each other at the time of starting or stopping the bearing. In these cases, the cylindrical sliding surfaces of the radial hydrodynamic bearing assembly are held substantially in line-to-line contact with each other, and the flat sliding surfaces of the thrust hydrodynamic bearing assembly are held in plane-to-plane contact with each other. These sliding surfaces are subjected to a pressure imposed by the weight of a rotatable body that is supported by the bearing. Insofar as the bearing supports the same rotatable body, the cylindrical sliding surfaces of the radial hydrodynamic bearing assembly which are held substantially in line-to-line contact with each other undergo a much higher pressure than the flat sliding surfaces of the thrust hydrodynamic bearing assembly which are held in plane-to-plane contact with each other.

For example, when the hydrodynamic bearing is incorporated in a motor that has its axis extending vertically, the rotatable body of the motor is supported substantially by the thrust hydrodynamic bearing assembly. When the hydrodynamic bearing is incorporated in a motor that has its axis extending horizontally, the rotatable body of the motor is supported substantially by the radial hydrodynamic bearing assembly. Therefore, while the motor repeatedly starts and stops rotating, the lubricating film on the sliding surfaces of the bearing deteriorates to a much greater degree when the motor axis lies horizontally than when the motor axis lies vertically.

A contact-start-and-stop (CSS) test was conducted on a hydrodynamic bearing incorporated in a spindle motor for use in a hard disk drive and having a lubricating film according to the second proposal. In the test, the bearing was started and stopped about 40,000 times reliably when the motor axis was extending vertically, but failed to start rotating after it was started and stopped about 500 times when the motor axis was extending horizontally. This indicates that as long as the motor axis extends horizontally, there is a practical problem with respect to the wear resistance of the sliding surfaces of the radial hydrodynamic bearing assembly even though the sliding surfaces are coated with a lubricating film.

The sliding surfaces have grooves for developing a hydrodynamic pressure, the grooves having a depth ranging from several microns to several tens of microns. These sliding surfaces and their components may be made of ceramics, and the sliding surfaces may be finished smoothly by grinding and other methods. Or, the sliding components may be made of metallic materials such as stainless steel or aluminum, and after making the sliding surfaces smooth, coatings such as silicon carbide (SiC), silicon nitride ($Si_3N_4$) or alumina ($Al_2O_3$) may be applied. The grooves in these sliding surfaces may be formed by thermal removal techniques such as laser processing, or by material removal technique such as ion etching or shot blasting.

When the grooves are formed in the ceramic sliding surfaces or in the ceramic coatings of the sliding surfaces, many microcracks are developed in the groove surfaces due to applied shocks or vibrations. Since the ceramic materials are brittle, each time the sliding surfaces contact each other when the bearing is started or stopped, the microcracks grow due to applied shocks until finally the ceramic sliding surfaces or the ceramic coatings suffer intergranular fracture.

Ceramic particles produced and separated from the ceramic sliding surfaces or the ceramic coatings by the intergranular fracture are about several microns across, and partly accumulated in the grooves and the gap between the sliding surfaces and partly discharged out of the bearing, The ceramic particles retained in the gap between the sliding surfaces cause abnormal wear on the sliding surfaces, shortening the service life of the bearing. The ceramic particles discharged out of the bearing contaminate the external environment. If the bearing is incorporated in a hard disk drive, then the discharged ceramic particles are likely to bring about fatal troubles such as a head crash or the like.

SUMMARY OF THE INVENTION

It is therefore an object of the present invention to provide a hydrodynamic bearing which has sliding surfaces whose coefficient of friction does not vary greatly under a relatively high pressure applied thereto, which maintains the frictional torque at a low level under repeated frequent starting and stopping irrespective of the orientation of a motor in which the bearing is incorporated.

Another object of the present invention is to provide a hydrodynamic bearing which does not produce abrasive particles and hence can maintain clean environment.

According to the present invention, there is provided a hydrodynamic bearing comprising a cylindrical radial bearing member having an outer circumferential surface, first and second thrust plates held against respective axially opposite ends of the cylindrical radial bearing member, the first and second thrust plates having confronting surfaces, respectively, a cylindrical radial sleeve having an inner circumferential surface facing the outer circumferential surface of the cylindrical radial bearing member, and a pair of axially opposite end surfaces facing the confronting surfaces, respectively, of the first and second thrust plates, the outer circumferential surface of the cylindrical radial bearing member and the inner circumferential surface of the cylindrical radial sleeve serving as sliding surfaces jointly making up a radial hydrodynamic bearing assembly, the confronting surfaces of the first and second thrust plates and the end surfaces of the cylindrical radial sleeve serving as sliding surfaces jointly making up a thrust hydrodynamic bearing assembly, at least one of the sliding surfaces of the thrust hydrodynamic bearing assembly having grooves formed therein for generating a hydrodynamic pressure, at least one of the sliding surfaces of the radial hydrodynamic bearing assembly being coated with a uniform hydrogenated amorphous carbon film, and at least one of the sliding surfaces of the thrust hydrodynamic bearing assembly being coated with a uniform hydrogenated amorphous carbon film.

The sliding surfaces of the radial and thrust hydrodynamic bearing assemblies may be made of a ceramic material. The ceramic material may be silicon carbide, silicon nitride, or alumina.

The hydrogenated amorphous carbon film may be deposited to a thickness of 200 Å on at least one of the sliding surfaces by plasma chemical vapor deposition.

At least one of the sliding surfaces of the hydrodynamic bearing assembly may be masked by a shaped mask, and then the hydrogenated amorphous carbon film may be deposited thereon, the hydrogenated amorphous carbon film having a thickness equal to the depth of the grooves, whereby areas of the sliding surface which are masked and not covered by the hydrogenated amorphous carbon film may serve as the grooves.

The grooves may be first formed in at least one of the sliding surfaces of the thrust hydrodynamic bearing assembly, and thereafter the hydrogenated amorphous carbon film may be deposited on at least one of the sliding surfaces including the grooves.

At least one of the sliding surfaces of the hydrodynamic bearing assemblies may have a surface roughness of at most 0.3 micron before the hydrogenated amorphous carbon film is deposited thereon.

The hydrogenated amorphous carbon film may be deposited on at least one of the sliding surfaces of each of the radial and thrust hydrodynamic bearing assemblies, and have an optimum thickness selected depending on the pressure to be applied to the sliding surfaces, and wherein the hydrogenated amorphous carbon film deposited on at least one of the sliding surfaces of the radial hydrodynamic bearing assembly and the hydrogenated amorphous carbon film deposited on at least one of the sliding surfaces of the thrust hydrodynamic bearing assembly may have different thicknesses.

The thickness of the hydrogenated amorphous carbon film deposited on at least one of the sliding surfaces of the thrust hydrodynamic bearing assembly may be about 500 Å, and the thickness of the hydrogenated amorphous carbon film deposited on at least one of the sliding surfaces of the radial hydrodynamic bearing assembly may be about 2,500 Å.

In the hydrodynamic bearing of the present invention, the sliding surfaces may be made of a metallic material or a ceramic material, and at least one of the sliding surfaces which face each other is coated with a uniform film of hydrogenated amorphous carbon (a—C:H) which is highly dense, has hardness next to a natural diamond and a low coefficient of friction, and is highly resistant to wear.

If the sliding surfaces are made of a ceramic material such as silicon carbide (SiC), silicon nitride ($Si_3N_4$), alumina ($Al_2O_3$), or the like, they adhere well to the hydrogenated amorphous carbon film deposited thereon for good results.

If the sliding surfaces are made of a metallic material, its coefficient of linear expansion is widely different from that of the hydrogenated amorphous carbon film. Therefore, cracks may be produced in the hydrogenated amorphous carbon film due to residual internal stresses developed by an increase in the temperature rise of the sliding surfaces when the hydrogenated amorphous carbon film is deposited. To avoid such a defect, the sliding surfaces may be coated with the ceramic material, referred to above, and then a hydrogenated amorphous carbon film may be deposited on the coated sliding surfaces. In this manner, the deposited hydrogenated amorphous carbon film adheres well to the sliding surfaces.

The surface roughness Ra of the sliding surfaces before they are coated with the hydrogenated amorphous carbon film is selected to be 0.3 micron or less to prevent the deposited hydrogenated amorphous carbon film from being broken or peeled off due to collision of surface irregularities on the sliding surfaces. If the surface roughness Ra of the sliding surfaces were in excess of 0.3 micron, then since the real contact surface area would be reduced, local pressures applied to the sliding surfaces would be increased thereby causing surface irregularities to collide with each other, tending to break or peel off the film.

The sliding surface may be selectively masked by a shaped mask, and then a hydrogenated amorphous carbon film may be deposited on exposed areas of the sliding surface to a uniform thickness that is equal to the depth of desired grooves for generating a hydrodynamic pressure. After the hydrogenated amorphous carbon film is formed, the mask is removed. The areas of the sliding surface which were masked by the mask and are not covered with the hydrogenated amorphous carbon film serve as grooves for generating a hydrodynamic pressure. Therefore, the depth of the grooves can be controlled highly accurately because the depth control can be achieved by controlling the thickness of the hydrogenated amorphous carbon film.

Alternatively, grooves for generating a hydrodynamic pressure may be formed in the sliding surfacer and then a hydrogenated amorphous carbon film may be deposited on the sliding surface including the grooves. Therefore, microcracks which may be developed in the grooved surfaces when the grooves are formed are covered with the hydrogenated amorphous carbon film that is highly dense and has a hardness next to natural diamond. Consequently, intergranular fracture is prevented from being caused by shocks due to collision of the sliding surfaces when the bearing starts and stops rotating.

With the thin film of hydrogenated amorphous carbon of 200 Å or greater, the sliding surfaces of the hydrodynamic bearing according to the present invention have a coefficient of friction of 0.3 or lower. In a sliding test in which an average pressure of about 60 $gf/cm^2$ was applied to the sliding surfaces, the coefficient of friction thereof remained almost unchanged while the sliding surfaces were sliding against each other for a long period of time, and the hydrodynamic bearing showed high durability as compared with other hydrodynamic bearings whose sliding surfaces are made of a ceramic material such as silicon carbide (SiC), silicon nitride ($Si_3N_4$), alumina ($Al_2O_3$), or are coated with a lubricating film as with the second proposal described above.

The above and other objects, features, and advantages of the present invention will become apparent from the following description when taken in conjunction with the accompanying drawings which illustrate preferred embodiments of the present invention by way of example.

DETAILED DESCRIPTION OF THE PREFERRED EMBODIMENTS

Figure 1:
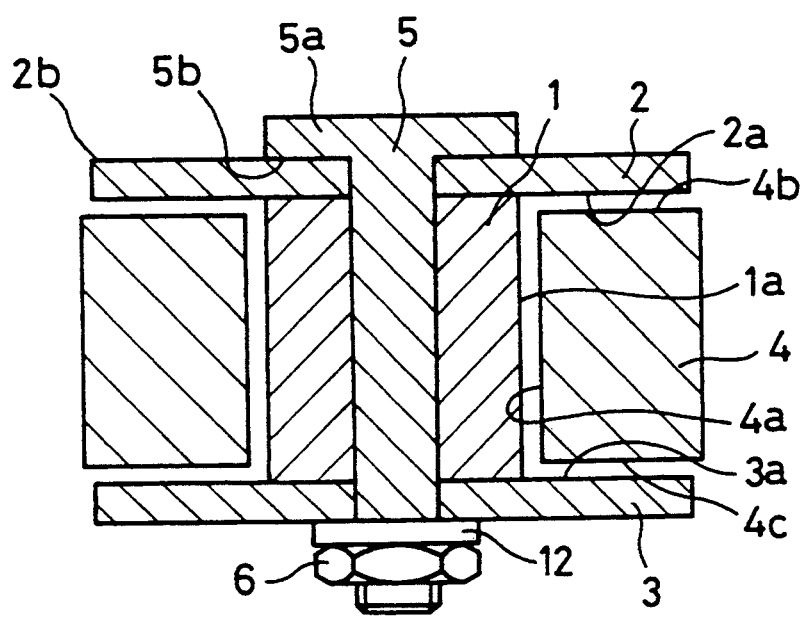
FIG. 1 is a cross-sectional view of a hydrodynamic bearing according to the present invention.

As shown in FIG. 1, a hydrodynamic bearing according to the present invention comprises a cylindrical radial bearing member 1 of a ceramic material, a pair of first and second thrust plates 2, 3 of a ceramic material which are held in direct contact with respective axial end surfaces of the radial bearing member 1, and a cylindrical radial sleeve 4 of a ceramic material which is disposed around the radial bearing member 1. The radial sleeve 4 has an inner circumferential surface 4a rotatably supported on an outer circumferential surface 1a of the radial bearing member 1, and a pair of opposite end surfaces 4b, 4c rotatably supported respectively on confronting surfaces 2a, 3a of the respective first and second thrust plates 2, 3.

The hydrodynamic bearing is assembled as follows: with the radial sleeve 4 held between the first and second thrust plates 2, 3, the first and second thrust plates 2, 3 are held against the respective end surfaces of the radial bearing member 1. Then, a spindle 5 is inserted axially downwardly through a through hole formed centrally axially in the radial bearing member 1 and also through the central holes formed in the respective thrust plates 2, 3. Thereafter, a nut 6 is threaded over the lower end of the spindle 5, and fastened to secure the radial bearing member 1 and the thrust plates 2, 3 axially together. The spindle 5 has a radial flange 5a on its upper end which has an axial surface 5b lying perpendicularly flat to the axis of the spindle 5. The first thrust plate 2 is sandwiched between the axial surface 5b and the upper end surface of the radial bearing member 1. The second thrust plate 3 is sandwiched between the lower end surface of the radial bearing member 1 and the upper surface of a washer 12 that is placed between the second thrust plate 3 and the nut 6.

The outer circumferential surface 1a of the radial bearing member 1 and the inner circumferential surface 4a of the radial sleeve 4 jointly make up a radial hydrodynamic bearing assembly. The confronting surfaces 2a, 3a of the respective first and second thrust plates 2, 3 and the end surfaces 4b, 4c of the radial sleeve 4 jointly make up a thrust hydrodynamic bearing assembly. The sliding surfaces of the radial hydrodynamic bearing assembly, i.e., the outer circumferential surface 1a and the inner circumferential surface 4a, and the sliding surfaces of the thrust hydrodynamic bearing assembly, i.e., the confronting surfaces 2a, 3a and the end surfaces 4b, 4c, are machined to desired levels of planarity (flatness), cylindricity (cylindrical accuracy), and circularity with a dimensional error limited to 1 micron or less. The clearance between these sliding surfaces for generating a hydrodynamic pressure is controlled within 2 to 10 microns.

Figure 2:
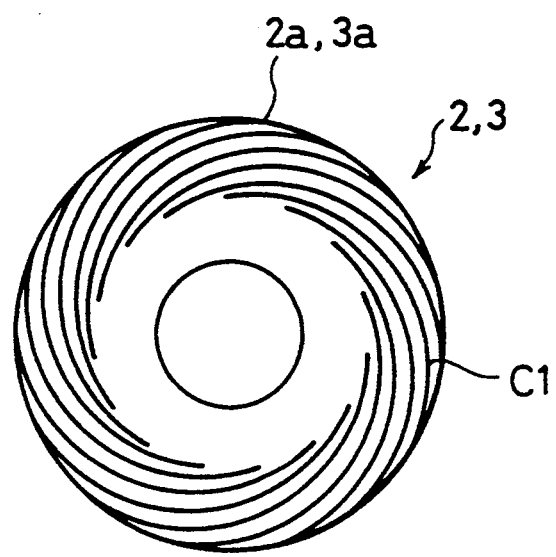
FIG. 2 is a plan view of spiral grooves for generating a hydrodynamic pressure which are formed in each of thrust plates of the hydrodynamic bearing.

As shown in FIG. 2, the confronting surfaces 2a, 3a of the respective first and second thrust plates 2, 3 have spiral grooves C1 formed therein for generating a hydrodynamic pressure. The end surfaces 4b, 4c of the radial sleeve 4 shown in FIG. 3 which face the respective confronting surfaces 2a, 3a are flat and have no grooves. Alternatively, the end surfaces 4b, 4c may have spiral grooves and the confronting surfaces 2a, 3a may be flat.

Figure 3:
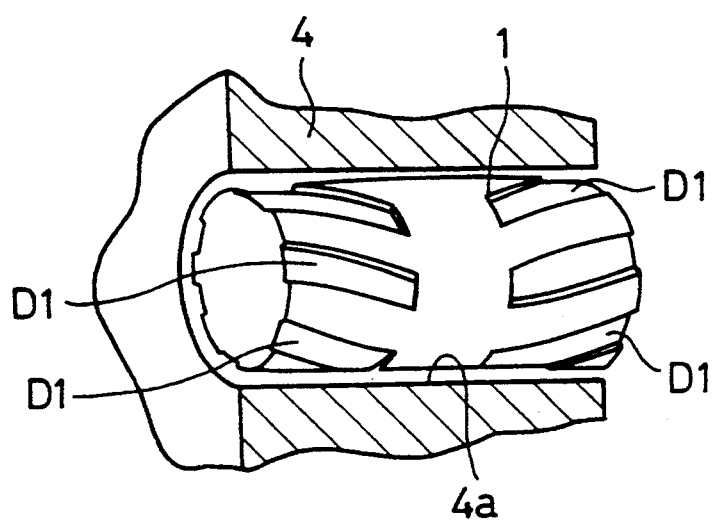
FIG. 3 is a perspective view of herringbone grooves for generating a hydrodynamic pressure which are formed in a radial bearing member of the hydrodynamic bearing.

As shown in FIG. 3, the outer circumferential surface 1a of the radial bearing member 1 has herringbone grooves D1 formed in axially opposite ends thereof for generating a hydrodynamic pressure. The inner circumferential surface 4a of the radial sleeve 4 which faces the outer circumferential surface 1a of the radial bearing member 1 is flat and has no grooves. Alternatively, the inner circumferential surface 4a may have herringbone grooves and the outer circumferential surface 1a may be flat.

So long as the hydrodynamic bearing is used in a relatively low speed range, no grooves for generating a radial hydrodynamic pressure may be formed in the radial hydrodynamic bearing assembly. For example, a spindle motor in a hard disk drive or a drum motor in a magnetic tape data storage device rotates in a speed ranging from 1,800 r.p.m. to 6,000 r.p.m. In such a relatively low speed range, the stiffness of the bearing may be higher without the grooves for generating a radial hydrodynamic pressure than with the grooves for generating a radial hydrodynamic pressure.

At least one of the outer circumferential surface 1a and the inner circumferential surface 4a is coated with a uniform hydrogenated amorphous carbon film by plasma CVD (Chemical Vapor Deposition), the hydrogenated amorphous carbon film having a thickness of 200 Å or greater.

At least one of the confronting surface 2a and the end surface 4b is coated with a uniform hydrogenated amorphous carbon film by plasma CVD, the hydrogenated amorphous carbon film having a thickness of 200 Å or greater.

At least one of the confronting surface 3a and the end surface 4c is coated with a uniform hydrogenated amorphous carbon film by plasma CVD, the hydrogenated amorphous carbon film having a thickness of 200 Å or greater.

Figure 8:
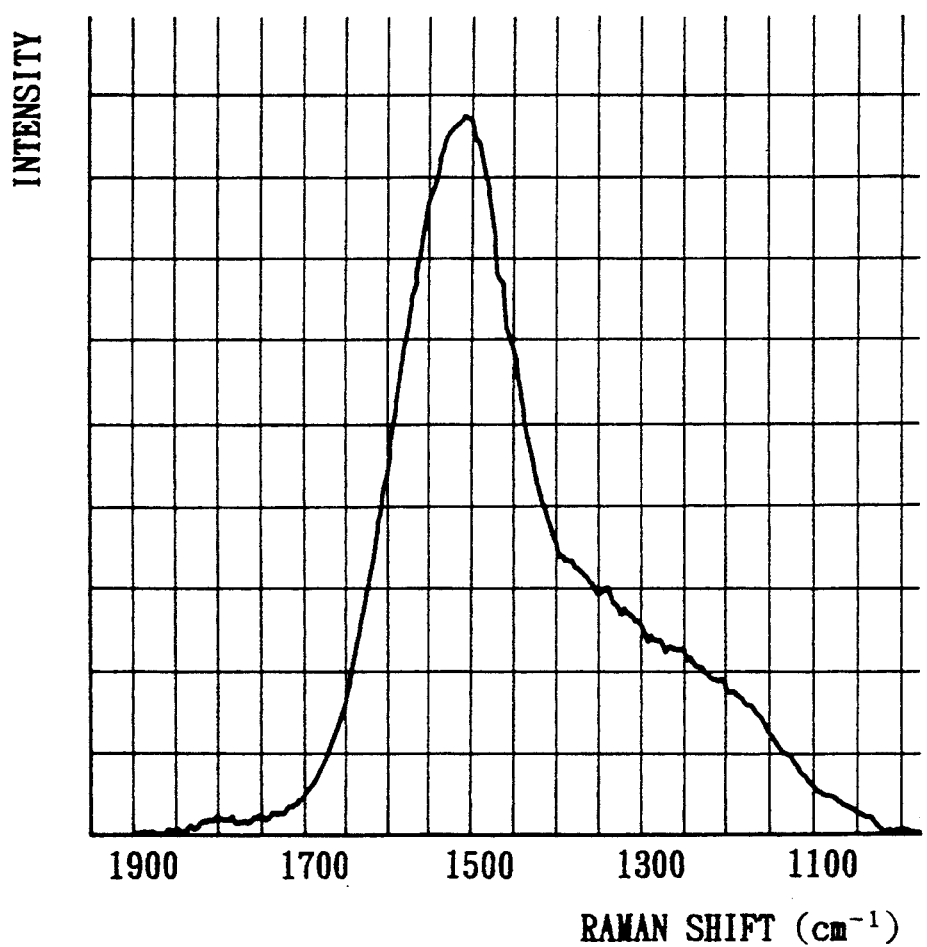
FIG. 8 is a graph showing the results of an analysis by Raman spectroscopy of a hydrogenated amorphous carbon (a—C:H) film.

As shown in FIG. 8, when the hydrogenated amorphous carbon film is analyzed by Raman spectroscopy, an asymmetric Raman spectral band having a shoulder band at around 1525 cm$^{-1}$ is observed. The ratio of the relative intensities of the two Raman spectral components is determined to be 1.31 by calculations. This indicates that the hydrogenated amorphous carbon film does not have a complete crystalline form such as a tetrahedral diamond (sp$^3$) structure which exhibits a single sharp Raman spectral peak in the vicinity of 1,332 cm$^{-1}$ or a three-coordinate laminar graphite (sp$^2$) structure which exhibits a single sharp Raman spectral peak in the vicinity of 1,581 cm$^{-1}$, but has the same characteristics as amorphous diamond carbon film characteristics having a broad Raman spectral band resulting from the sp$^2$-like structure.

Figure 4:
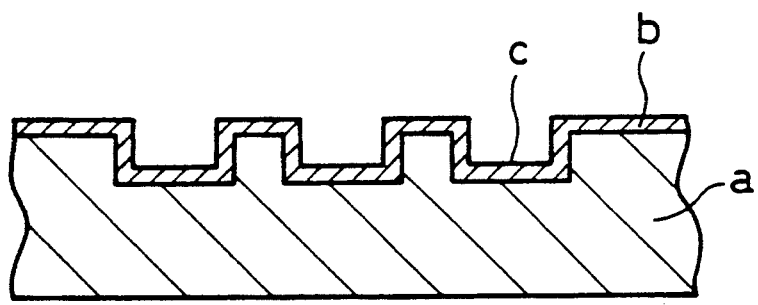
FIG. 4 is an enlarged fragmentary cross-sectional view of grooves for generating a hydrodynamic pressure which are formed according to one process.

The hydrogenated amorphous carbon film is applied as follows: As shown in FIG. 4, grooves "c" for generating a hydrodynamic pressure are formed on a flat smooth sliding surface "a" by a laser beam or the like, and then a hydrogenated amorphous carbon film "b" having a uniform thickness is deposited on the sliding surface "a" including the grooves "c".

Therefore, any microcracks that may have been produced in the groove surfaces when the grooves "c" were formed are covered with the hydrogenated amorphous carbon film "b". As a consequence, no intergranular fracture takes place even under shocks applied when the sliding surfaces contact each other at the time of starting and stopping, and no abrasive ceramic particles are produced, thereby preventing the sliding surfaces from being abnormally worn and also preventing the external environment from being contaminated.

If the grooves for generating a hydrodynamic pressure are about 2 μm deep or less, the depth of the grooves cannot accurately be controlled by laser machining, shot blasting or the like because the size of the crystal grains of ceramic is larger than the depth of the grooves.

Figure 5:
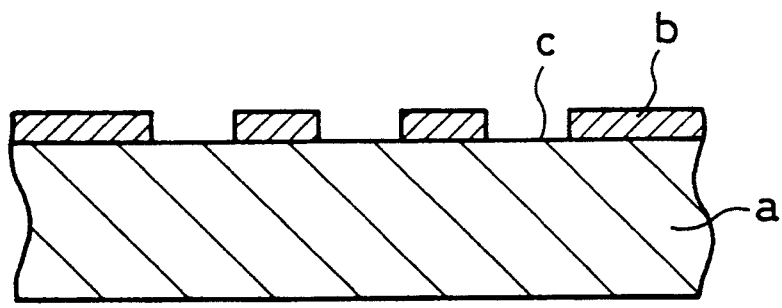
FIG. 5 is an enlarged fragmentary cross-sectional view of grooves for generating a hydrodynamic pressure which are formed according to another process.

Forming grooves for generating a hydrodynamic pressure in the sliding surfaces by way of laser machining, shot blasting or the like tends to produce microcracks causing intergranular fracture from stresses that are imposed when the grooves are formed. This is because ceramic particles that are removed out of grooves when the grooves are formed leave holes whose depth is greater than the desired groove depth. To avoid such a deficiency, a flat smooth sliding surface "a" is selectively masked by a shaped mask made of metal or heat-resistant resin such as polyamide as shown in FIG. 5, and then a hydrogenated amorphous carbon film "b" is deposited on exposed areas of the sliding surface to a uniform thickness that is equal to the depth of the desired grooves for generating a hydrodynamic pressure. After the hydrogenated amorphous carbon film "b" is formed, the mask is removed.

As shown in FIG. 5, the areas of the sliding surface "a", which were masked by the mask, serve as grooves "c" for generating a hydrodynamic pressure. The depth of the grooves "c" can be controlled highly accurately because the depth control can be achieved by controlling the thickness of the hydrogenated amorphous carbon film "b". However, the process shown in FIG. 5 is not effective if the depth of the grooves "c" exceeds 2 μm for the reason that depositing a hydrogenated amorphous carbon film thicker than 2 μm would be time-consuming, require a large film fabrication system, and hence be highly costly.

From the standpoint of cost, the hydrogenated amorphous carbon film should preferably be deposited to a minimum thickness required on each of the desired sliding surfaces. Specifically, if the bearing is to be used under a high pressure on the sliding surfaces and hence to have high durability, then the thickness of the hydrogenated amorphous carbon film should not be reduced. However, the bearing is to be used under a low pressure on the sliding surfaces, then the hydrogenated amorphous carbon film should be of a minimum thickness which enables to deposit the film uniformly.

In this embodiment, an optimum thickness of the hydrogenated amorphous carbon film is selected on the basis that the pressure applied to the sliding surfaces of the radial hydrodynamic bearing assembly is higher than the pressure applied to the sliding surfaces of the thrust hydrodynamic bearing assembly. Specifically, when the film thickness on the sliding surfaces of the thrust hydrodynamic bearing assembly was about 500 Å and the film thickness on the sliding surfaces of the radial hydrodynamic bearing assembly was about 2,500 Å, the hydrodynamic bearing was of a low cost and highly durable.

To achieve highly accurate rotational performance required by various data storage devices or the like, the sliding surfaces are machined to desired levels of planarity, cylindricity, and circularity with a dimensional error limited to 1 micron or less, and the clearance between these sliding surfaces for generating a hydrodynamic pressure is controlled to range from 2 to 10 microns, as described above. The sliding surfaces should preferably have a surface roughness Ra of 0.3 micron or less. If the surface roughness Ra were greater than 0.3 micron, then since the real contact surface area would be reduced, local pressures applied to the sliding surfaces would be increased thereby causing surface irregularities to collide with each other, tending to break or peel off the film.

The hydrogenated amorphous carbon film is deposited on each sliding surface by plasma CVD, after the sliding surface has been sufficiently degreased and cleaned by ultrasonic cleaning or the like, followed by complete removal of the organic materials by ion etching or the like.

An experiment was conducted for depositing hydrogenated amorphous carbon film by way of high-frequency plasma CVD. In the experiment, a base plate of silicon carbide, serving to provide a sliding surface, was ground to a surface roughness Ra of 0.3 micron, and a hydrogenated amorphous carbon film was deposited to a thickness of about 2,500 Å on the base plate using a material gas composed of a mixture of a methane gas and a hydrogen gas with a high-frequency power output of about 300 W at a frequency of 13.56 MHz. The base plate was initially kept at room temperature, and at about 120° C. after the reaction is started. The total deposition pressure was about 0.01 Torr, and the film was deposited at a rate of about 3,000 Å/min.

If the thickness of the hydrogenated amorphous carbon film on the base plate were less than 200 Å, it would be difficult to accurately control the formation of the hydrogenated amorphous carbon film on the base plate, and the film formed on the base plate would tend to be defective and would not be of a high and uniform quality. Accordingly, it is preferable for the hydrodynamic bearing to have a hydrogenated amorphous carbon film whose thickness is 200 Å or more on the desired sliding surfaces.

The hydrogenated amorphous carbon film may be deposited by way of microwave plasma CVD, PVD, or the like, as well as the high-frequency plasma CVD.

The sliding surfaces of the radial and thrust hydrodynamic bearing assemblies may be made of a material to which the hydrogenated amorphous carbon film can adhere well. Good results were obtained if the sliding surfaces are made of a ceramic material such as silicon carbide (SiC), silicon nitride ($Si_3N_4$), alumina ($Al_2O_3$), or the like.

If the sliding surfaces are made of a metallic material, because its coefficient of linear expansion is widely different from that of the hydrogenated amorphous carbon film, cracks may be produced in the hydrogenated amorphous carbon film due to residual internal stresses developed due to an increase in the temperature rise of the sliding surfaces when the hydrogenated amorphous carbon film is deposited. To avoid such a defect, the sliding surfaces may be coated with the ceramic material, referred to above, and then a hydrogenated amorphous carbon film may be deposited on the coated sliding surfaces. In this manner, the deposited hydrogenated amorphous carbon film adheres well to the sliding surfaces.

Figure 6:
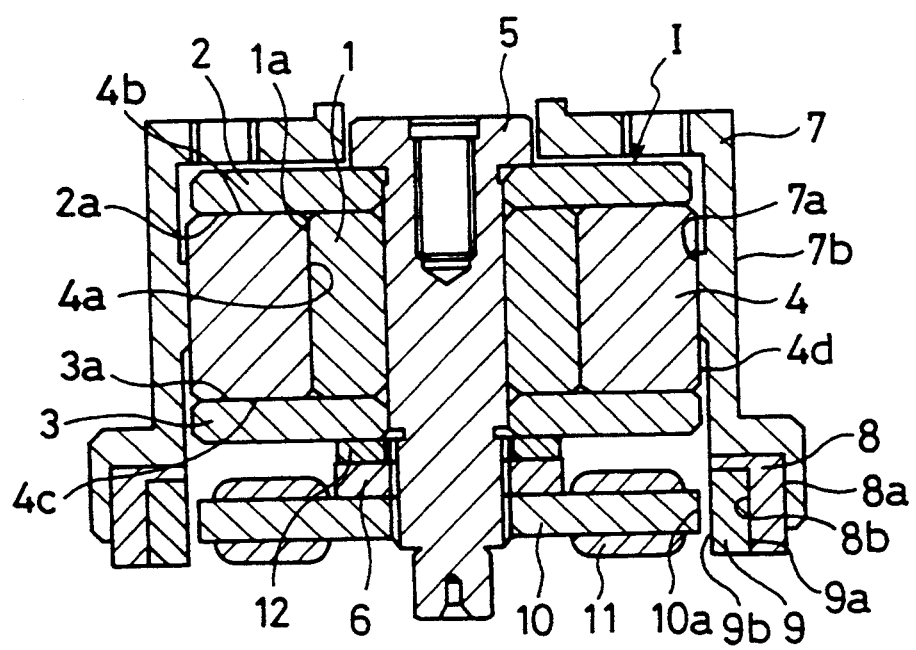
FIG. 6 is a cross-sectional view of a spindle motor for use in a hard disk drive, the spindle motor incorporating a hydrodynamic bearing according to the present invention.

A spindle motor for use in a hard disk drive, which incorporates a hydrodynamic bearing according to the present invention will be described below with reference to FIG. 6. As shown in FIG. 6, the spindle motor incorporates a hydrodynamic bearing, generally denoted at I, according to the present invention. The hydrodynamic bearing I is essentially identical in structure to the hydrodynamic bearing shown in FIG. 1.

The spindle motor includes a hub 7 of aluminum or the like having an inner circumferential surface 7a to which the outer circumferential surface 4d of the radial sleeve 4 is fixed. The hub 7 has an outer circumferential surface 7b around which a stack of magnetic disks (not shown) will be placed. The hub 7 includes a cup-shaped radially outward flange on its lower end. The spindle motor also includes a back yoke 8 fitted in the cup-shaped radially outward flange of the hub 7. The back yoke 8 has an outer circumferential surface 8a that is fixed to an inner circumferential surface of the cup-shaped radially outward flange. A rotor magnet 9 has an outer circumferential surface 9a fixed to an inner circumferential surface 8b of the back yoke 8.

The spindle motor has a stator core 10 secured to the lower end of the spindle 5 which extends through a through hole formed centrally in the stator core 10. The stator core 10 has an outer circumferential surface 10a spaced radially inwardly from and confronting an inner circumferential surface 9b of the rotor magnet 9. A field coil 11 is wound on the stator core 10. When a current is supplied to the field coil 11, the hub 7 to which the rotor magnet 9 is fixed is rotated about the axis of the spindle 5. When the hub 7 is rotated, a hydrodynamic pressure is developed between the confronting surfaces 2a, 3a of the respective first and second thrust plates 2, 3 and the end surfaces 4b, 4c of the radial sleeve 4, thereby completing the thrust hydrodynamic bearing assembly. At the same time, a hydrodynamic pressure is developed between the outer circumferential surface 1a of the radial bearing member 1 and the inner circumferential surface 4a of the radial sleeve 4, thereby completing the radial hydrodynamic bearing assembly.

A contact start and stop (CSS) test was conducted on the hydrodynamic bearing I in the spindle motor with four 2.5-inch-diameter magnetic disks supported thereon. In the test, the hydrodynamic bearing I was started and stopped more than 100,000 times with the motor axis extending vertically, and was also started and stopped 50,000 times with the motor axis extending horizontally. During the repetitive operation of the bearing, the bearing showed almost no increase in the frictional torque upon starting, and produced no abrasive particles from the sliding surfaces.

Figure 7:
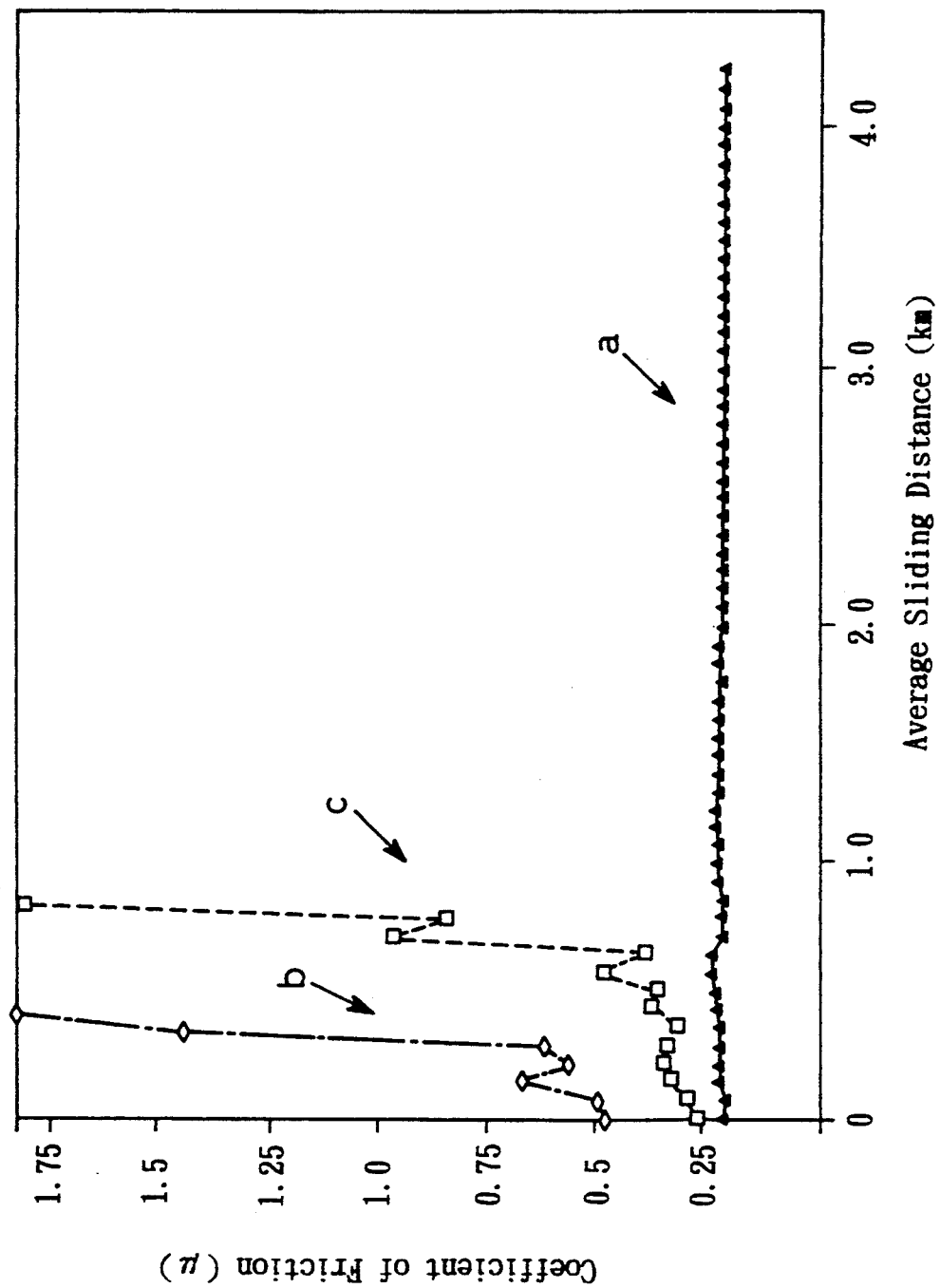
FIG. 7 is a graph showing the results of a sliding test conducted on a hydrodynamic bearing according to the present invention and on other comparative hydrodynamic bearings.

FIG. 7 illustrates the results of a sliding test conducted on a hydrodynamic bearing according to the present invention and other comparative hydrodynamic bearings.

The curve "a" in FIG. 7 represents the result of the sliding test on a hydrodynamic bearing which is structurally identical to the hydrodynamic bearing shown in FIG. 1. The sliding surfaces of the thrust plates 2, 3 and the radial sleeve 4 were made of silicon carbide (SiC), and coated with a uniform hydrogenated amorphous carbon film having a thickness of 2,500 Å. In the test, the spindle was directed vertically, and the bearing was checked for changes in the coefficient of friction of the sliding surfaces with respect to the average sliding distance that the sliding surfaces of the thrust hydrodynamic bearing were subjected to. The test was carried out under such conditions that a static load was axially applied at an average pressure of about 60 gf/cm$^2$ to the confronting surfaces of the thrust plates and the end surfaces of the radial sleeve, and to cause the confronting surfaces of the thrust plates and the end surfaces of the radial sleeve to be slid relatively to each other at a speed of about 0.7 mm/second. As indicated by the curve "a", the coefficient of friction remained almost unchanged past the average sliding distance of 4,300 m. No abrasive marks were observed on the confronting surfaces of the thrust plates and the end surfaces of the radial sleeve after the test.

The curve "b" in FIG. 7 represents the result of the sliding test on a comparative hydrodynamic bearing which is structurally similar to the hydrodynamic bearing indicated by the curve "a", except that no thin lubricating film was deposited on the sliding surfaces of silicon carbide, and the sliding surfaces were held in direct sliding contact with each other. The comparative hydrodynamic bearing represented by the curve "b" was tested under the same conditions as the hydrodynamic bearing represented by the curve "a". As shown by the curve "b", the coefficient of friction increased sharply after the average sliding distance reached about 220 m. Many abrasive marks were observed on the confronting surfaces of the thrust plates and the end surfaces of the radial sleeve after the test.

The curve "c" in FIG. 7 represents the result of the sliding test on another comparative hydrodynamic bearing which is structurally similar to the hydrodynamic bearing indicated by the curve "a", except that the sliding surfaces were coated with a thin lubricating film of a fluoropolymer with a functional group according to the conventional second approval described above. The comparative hydrodynamic bearing represented by the curve "c" was tested under the same conditions as the hydrodynamic bearing represented by the curve "a". As shown by the curve "c", the coefficient of friction increased sharply due to deterioration of the thin lubricating film after the average sliding distance reached about 630 m. A few abrasive marks were observed on the confronting surfaces of the thrust plates and the end surfaces of the radial sleeve after the test.

The hydrodynamic bearing according to the present invention offers the following advantages:

(1) At least one of the sliding surfaces which face each other is coated with a uniform film of hydrogenated amorphous carbon (a—C:H) which is highly dense, has hardness next to natural diamond and a low coefficient of friction, and is highly resistant to wear. Therefore, the hydrodynamic bearing has sliding surfaces whose coefficient of friction does not vary greatly under a relatively high pressure applied thereto, and maintains the frictional torque at a low level when it is started and stopped after repeated frequent starting and stopping irrespective of the orientation of a motor in which the bearing is incorporated. Further, the hydrodynamic bearing does not produce abrasive particles and hence can maintain clean environment.

(2) Since the sliding surfaces are made of a ceramic material such as silicon carbide (SiC), silicon nitride ($Si_3N_4$), alumina ($Al_2O_3$), or the like, they adhere well to the hydrogenated amorphous carbon film deposited thereon. If the sliding surfaces are made of a metallic material, its coefficient of linear expansion is widely different from that of the hydrogenated amorphous carbon film. Therefore, cracks may be produced in the hydrogenated amorphous carbon film due to residual internal stresses developed due to an increase in the temperature rise of the sliding surfaces during the deposition of the hydrogenated amorphous carbon film. To avoid such a defect, the sliding surfaces may be coated with the ceramic material, referred to above, and then a hydrogenated amorphous carbon film may be deposited on the coated sliding surfaces. In this manner, the deposited hydrogenated amorphous carbon film well adheres to the sliding surfaces.

(3) The surface roughness Ra of the sliding surfaces before they are coated with the hydrogenated amorphous carbon film is selected to be 0.3 micron or less to prevent the deposited hydrogenated amorphous carbon film from being broken or peeled off due to collision of surface irregularities on the sliding surfaces. If the surface roughness Ra of the sliding surfaces were in excess of 0.3 micron, then since the real contact surface area would be reduced, local pressures applied to the sliding surfaces would be increased thereby causing surface irregularities to collide with each other, tending to break or peel off the film.

(4) The sliding surface may be selectively masked by a shaped mask, and then a hydrogenated amorphous carbon film may be deposited on exposed areas of the sliding surface to a uniform thickness that is equal to the depth of desired grooves for generating a hydrodynamic pressure. After the hydrogenated amorphous carbon film is formed, the mask is removed. The areas of the sliding surface which were masked by the mask and are not covered with the hydrogenated amorphous carbon film serve as grooves for generating a hydrodynamic pressure. Therefore, the depth of the grooves can be controlled highly accurately because the depth control can be achieved by controlling the thickness of the hydrogenated amorphous carbon film.

(5) Alternatively, grooves for generating a hydrodynamic pressure may be formed in the sliding surface, and then a hydrogenated amorphous carbon film may be deposited on the sliding surface including the grooves. Therefore, microcracks which may be developed in the groove surfaces when the grooves were formed are covered with the hydrogenated amorphous carbon film that is highly dense and has hardness next to natural diamond. Consequently, intergranular fracture is prevented from being caused by shocks due to collision of the sliding surfaces when the bearing starts and stops rotating.

Although certain preferred embodiments of the present invention has been shown and described in detail, it should be understood that various changes and modifications may be made therein without departing from the scope of the appended claims.

What is claimed is:

1. A hydrodynamic bearing comprising:
a cylindrical radial bearing member having an outer circumferential surface;
first and second thrust plates held against the respective axially opposite ends of said cylindrical radial bearing member, said first and second thrust plates having confronting surfaces, respectively;
a cylindrical radial sleeve having an inner circumferential surface facing said outer circumferential surface of said cylindrical radial bearing member, and a pair of axially opposite end surfaces facing said confronting surfaces, respectively, of said first and second thrust plates; wherein
said outer circumferential surface of said cylindrical radial bearing member and said inner circumferential surface of said cylindrical radial sleeve serving as sliding surfaces jointly making up a radial hydrodynamic bearing assembly;
said confronting surfaces of said first and second thrust plates and said end surfaces of said cylindrical radial sleeve serving as sliding surfaces jointly making up a thrust hydrodynamic bearing assembly;
at least one of said sliding surfaces of said thrust hydrodynamic bearing assembly having grooves formed therein for generating a hydrodynamic pressure;
at least one of the sliding surfaces of said radial hydrodynamic bearing assembly being coated with a uniform hydrogenated amorphous carbon film; and
at least one of the sliding surfaces of said thrust hydrodynamic bearing assembly being coated with a uniform hydrogenated amorphous carbon film.

2. The hydrodynamic bearing according to claim 1, wherein at least one of said sliding surfaces of said radial hydrodynamic bearing assembly is provided with grooves formed therein for generating a hydrodynamic pressure.

3. The hydrodynamic bearing according to claim 2, wherein said at least one of said sliding surfaces of said radial hydrodynamic bearing assembly is masked by a shaped mask, and then said hydrogenated amorphous carbon film is deposited thereon to a thickness equal to the depth of said grooves, whereby areas of the sliding surface which are masked and not covered by said hydrogenated amorphous carbon film serve as said grooves.

4. The hydrodynamic bearing according to claim 2, wherein said grooves are first formed in said at least one of said sliding surfaces of said radial hydrodynamic bearing assembly, and thereafter said hydrogenated amorphous carbon film is deposited on said at least one of said sliding surfaces including said grooves.

5. The hydrodynamic bearing according to claim 1, wherein said sliding surfaces of said radial hydrodynamic bearing assembly are made of a ceramic material.

6. The hydrodynamic bearing according to claim 5 wherein said ceramic material is selected from the group consisting of silicon carbide, silicon nitride, and alumina.

7. The hydrodynamic bearing according to claim 1, wherein said sliding surfaces of said thrust hydrodynamic bearing assembly are made of a ceramic material.

8. The hydrodynamic bearing according to claim 1, wherein said hydrogenated amorphous carbon film is deposited to a thickness of 200 Å by plasma chemical vapor deposition.

9. The hydrodynamic bearing according to claim 1, wherein said at least one of said sliding surfaces of said thrust hydrodynamic bearing assembly is masked by a shaped mask, and then said hydrogenated amorphous carbon film is deposited thereon to a thickness equal to the depth of said grooves, whereby areas of the sliding surface which are masked and not covered by said hydrogenated amorphous carbon film serve as said grooves.

10. The hydrodynamic bearing according to claim 1, wherein said grooves are first formed in said at least one of said sliding surfaces of said thrust hydrodynamic bearing assembly, and thereafter said hydrogenated amorphous carbon film is deposited on said at least one of said sliding surfaces including said grooves.

11. The hydrodynamic bearing according to claim 1, wherein said at least one of the sliding surfaces of said radial hydrodynamic bearing assembly has a surface roughness of not more than 0.3 micron before said hydrogenated amorphous carbon film is deposited thereon.

12. The hydrodynamic bearing according to claim 1, wherein said at least one of the sliding surfaces of said thrust hydrodynamic bearing assembly has a surface roughness of not more than 0.3 micron before said hydrogenated amorphous carbon film is deposited thereon.

13. The hydrodynamic bearing according to claim i, wherein said hydrogenated amorphous carbon film has an optimum thickness selected depending on a pressure to be applied to the sliding surfaces, and wherein the hydrogenated amorphous carbon film on said radial hydrodynamic bearing assembly and the hydrogenated amorphous carbon film on said thrust hydrodynamic bearing assembly have different thicknesses.

14. The hydrodynamic bearing according to claim 13, wherein the thickness of the hydrogenated amorphous carbon film deposited on the thrust hydrodynamic bearing assembly is about 500 Å, and the thickness of the hydrogenated amorphous carbon film deposited on the radial hydrodynamic bearing assembly is about 2,500 Å.

15. The hydrodynmamic bearing according to claim 7, wherein said ceramic material is selected from the group consisting of silicon carbide, silicon nitride, and alumina.

* * * * *